(12) United States Patent
Azema

(10) Patent No.: US 6,376,120 B1
(45) Date of Patent: Apr. 23, 2002

(54) CURRENT CUTOFF MECHANISM FOR CELL

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/324,996

(22) Filed: Jun. 2, 1999

(30) Foreign Application Priority Data

Jun. 15, 1998 (JP) ............................................. 10-166494

(51) Int. Cl.[7] ......................................... H01M 002/34

(52) U.S. Cl. ................................ 429/61; 429/7; 429/57; 429/90

(58) Field of Search ............................... 429/61, 57, 7, 429/90

(56) References Cited

U.S. PATENT DOCUMENTS

| 4,943,497 A |   | 7/1990 | Oishi et al. |
| 5,609,972 A | * | 3/1997 | Kaschmitter et al. |
| 5,705,290 A |   | 1/1998 | Azema |
| 6,207,319 B1 | * | 3/2001 | Nam ........................ 429/57 X |
| 6,207,320 B1 | * | 3/2001 | Song et al. ............... 429/61 X |

* cited by examiner

Primary Examiner—John S. Maples
(74) Attorney, Agent, or Firm—Brinks Hofer Gilson & Lione

(57) ABSTRACT

In a current cutoff mechanism for a cell, when the internal pressure of a cell case exceeds a predetermined value, a diaphragm section is displaced upward, and a terminal is broken from portions of a V-shaped groove section in contact with two slits, thereby cutting off the current path formed between a cell lid and a power generating element inside the cell.

8 Claims, 10 Drawing Sheets

CURRENT CUTOFF MECHANISM FOR CELL

BACKGROUND OF THE INVENTION

1. Field of the Invention

The present invention relates to a current cutoff mechanism for a cell, and more particularly, to a current cutoff mechanism for a cell which may be used to ensure safety even when pressure inside a cell case rises excessively.

2. Description of the Related Art

For example, a rechargeable lithium-ion secondary cell, in which an organic solvent type electrolyte is sealed inside a cell case, has been widely used hitherto as a power source for portable devices such as portable telephones and personal computers.

If such a cell is overcharged or is charged using a higher current than a specified current at the time of recharging, however, trouble may occur in the cell. Gas is generated inside the cell case, and the generation of gas raises the pressure and temperature inside the cell. The cell case may undergoes swell, crack, etc., and the electrolyte contained therein may exude to the outside. These may adversely affect the device incorporating the cell.

Furthermore, if use of the cell is continued in the above-described abnormal condition, swelling of the cell progresses, which may pose a danger that the cell case will rupture. Therefore, it is necessary to immediately stop the use of the cell in abnormal conditions.

A description will be given of a conventional current cutoff mechanism for a cell, for example, a circular cell, for use in solving the above problems.

Referring to FIGS. 13 and 14, a cell lid 3 is fixed to a cell case 1 via a gasket 2 by caulking or other methods so as to hermetically seal the inside of the cell case 1, and an actuator 4 is disposed below the cell lid 3 so as to be displaced upward.

The cell lid 3 has vent holes 3a that allow the internal gas which has increased in pressure to escape therefrom to the outside when the actuator 4 is cleaved due to an increase in pressure inside the cell case 1.

The actuator 4 has an annular safety valve portion 4a formed by drawing or by other methods. The safety valve portion 4a includes a projection 4b projecting downward from the center, and radial grooves 4c formed on the lower surface around the projection 4b. The part of the actuator 4 where the grooves 4c are formed is made thin-walled, which allows the actuator 4 to be cleaved by an increase in pressure inside the cell case 1.

An insulating plate 5 is disposed under the actuator 4, through which the insulating plate 5, a hole 5a for passing the projection 4b of the safety valve portion 4a therethrough, and a vent hole 5b are formed.

Furthermore, a lead fixing member 6 is disposed under the insulating plate 5. The lead fixing member 6 has a hole 6a and a vent hole 6b respectively communicating with the hole 5a and the vent hole 5b of the insulating plate 5.

The projection 4b of the safety valve portion 4a is passed through the holes 5a and 6a of the insulating substrate 5 and the lead fixing member 6, and a lead 7 formed of a thin metal plate is attached to the leading end of the projection 4b.

The thin-plate lead 7 has a joint portion 7a to be joined to the leading end of the projection 4b by welding or by other methods, whereby the actuator 4 and the lead 7 are electrically connected to each other. The other end of the lead 7 is connected to a power generating element 8 disposed in the lower part of the figure, so that a current path is formed between the power generating element 8 and the cell lid 3.

In a case in which the pressure inside the cell case 1 rises due to a problem inside the cell, gas which has increased in pressure flows from the vent holes 5b and 6b, as shown by arrow A in FIG. 14, and the force is applied to push the back of the safety valve portion 4a upward.

This force displaces the safety valve portion 4a upward, and concentrated stress acts on the joint portion 7a of the lead 7. By this concentrated stress, the joint portion 7a is broken, and the electrical connection between the lead 7 and the actuator 4 is also broken, thereby cutting off the current path in the cell.

This cuts off the flow of the current inside the cell, and blocks the increase in pressure inside the cell case 1. If the internal pressure of the cell further rises in spite of the cutoff of the current path, an even higher internal pressure is applied to the radial grooves 4c formed in the safety valve portion 4a. The thin-walled part of the actuator 4 having the grooves 4c is thereby cleaved, and the internal gas which has increased in pressure escapes from the cleaved part to the outside through the vent holes 3a. As a result, the cell can be prevented from being ruptured.

Portable devices, such as portable telephones, using such a conventional cell have become more compact, and there is a strong demand for size reduction of cells for use in the portable devices.

In the above-described conventional current cutoff mechanism, however, the actuator 4 must be large so that it operates without any trouble even when the internal pressure of the cell rises to a low pressure. For this reason, it is difficult to reduce the size of the conventional current cutoff mechanism.

Since the entire lead 7 is formed of a thin plate, when the internal pressure of the cell increases, the joint portion 7a is pulled and extended by the actuator 4 and is severed from the lead 7. Therefore, long fibrous burrs or the like are formed on a broken surface of the joint portion 7a and a broken surface of a broken hole 7b, which is formed by breaking the joint portion 7a. These burrs sometimes make it impossible to perfectly cut off the current path between the actuator 4 displaced up and the lead 7.

SUMMARY OF THE INVENTION

Accordingly, it is an object of the present invention to solve the above problems and to provide a high-performance current cutoff mechanism for a cell, which achieves size reduction and reliable current cutoff.

In order to achieve the above object, according to an aspect of the present invention, there is provided a current cutoff mechanism for a cell, including a cell case having a power generating element held therein; a cell lid for hermetically shielding the inside of the cell case; a diaphragm section protruding toward the inside of the cell case; an internal electrode connected to the power generating element and having a joint portion to be joined to approximately the center of the diaphragm section; and a fixing member for fixing the internal electrode inside the cell case while the internal electrode is joined to the diaphragm section, wherein a current path is formed between the cell lid and the power generating element via the diaphragm section and the internal electrode, a groove portion is formed to thin a portion in the vicinity of the joint portion of the internal electrode, and the internal electrode is broken from the groove portion to cut off the current path when the internal pressure of the cell case exceeds a predetermined value and the diaphragm section is displaced.

Preferably, the groove portion has a V-shaped cross section, and is annularly formed around the joint portion.

Preferably, a slit curved along the groove portion is formed in a part of the groove portion.

Preferably, two slits are formed opposed to each other across the joint portion.

Preferably, one of the slits is longer than the other slit.

The joint portion held between the two slits may be placed closer to one of the slits.

A break-inducing portion may be formed by slightly cutting a part of the groove portion in contact with both ends of the slit so that the internal electrode is broken from the side of the break-inducing portion when the internal pressure of the cell case rises.

According to another aspect of the present invention, there is provided a current cutoff mechanism for a cell, including a cell case having a power generating element held therein; a cell lid for hermetically shielding the inside of the cell case; a diaphragm section protruding toward the inside of the cell case; an internal electrode connected to the power generating element and having a joint portion to be joined to approximately the center of the diaphragm section; and a fixing member for fixing the internal electrode inside the cell case while the internal electrode is joined to the diaphragm section, wherein a current path is formed between the cell lid and the power generating element via the diaphragm section and the internal electrode, two arc-shaped slits are formed around the joint portion so as to be opposed to each other, the clearances between both ends of the two slits are made small, and the internal electrode is broken from the clearances when the internal pressure of the cell case exceeds a predetermined value and the diaphragm section is displaced.

Further objects, features, and advantages of the present invention will become apparent from the following description of the preferred embodiments with reference to the attached drawings.

DESCRIPTION OF THE PREFERRED EMBODIMENTS

Figure 1:
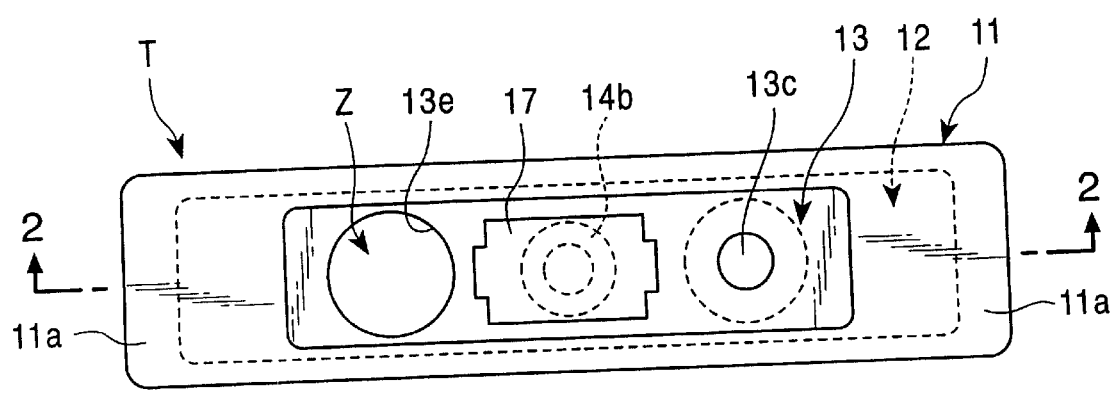
FIG. 1 is a top view of a current cutoff mechanism for a cell according to the present invention.
Figure 2:
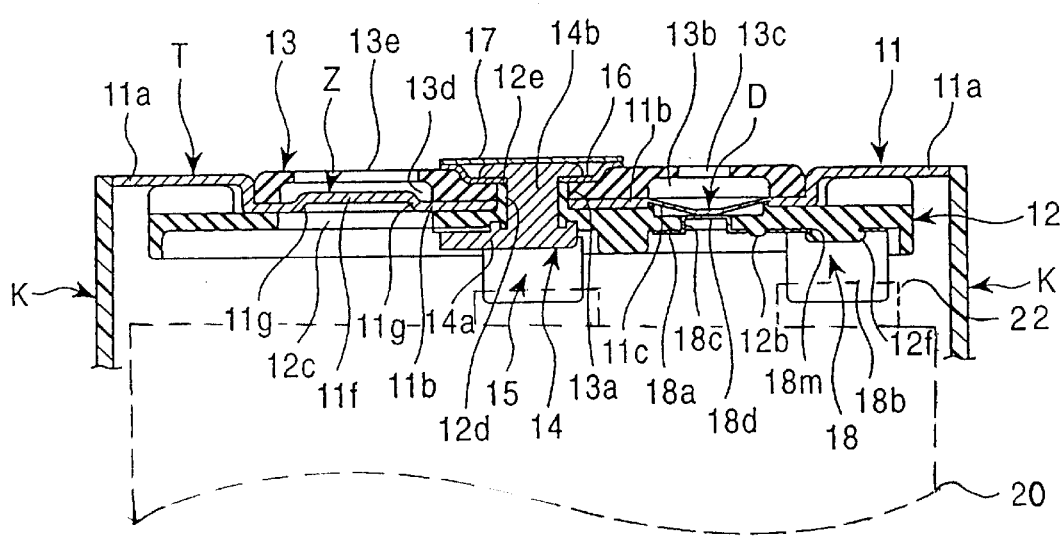
FIG. 2 is a cross-sectional view of the current cutoff mechanism.
Figure 3:
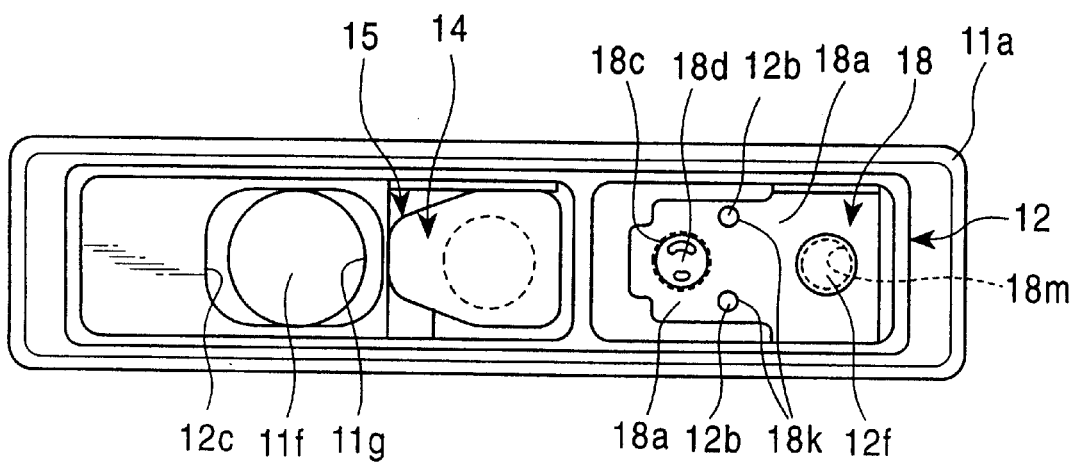
FIG. 3 is a bottom view of the current cutoff mechanism.
Figure 4:
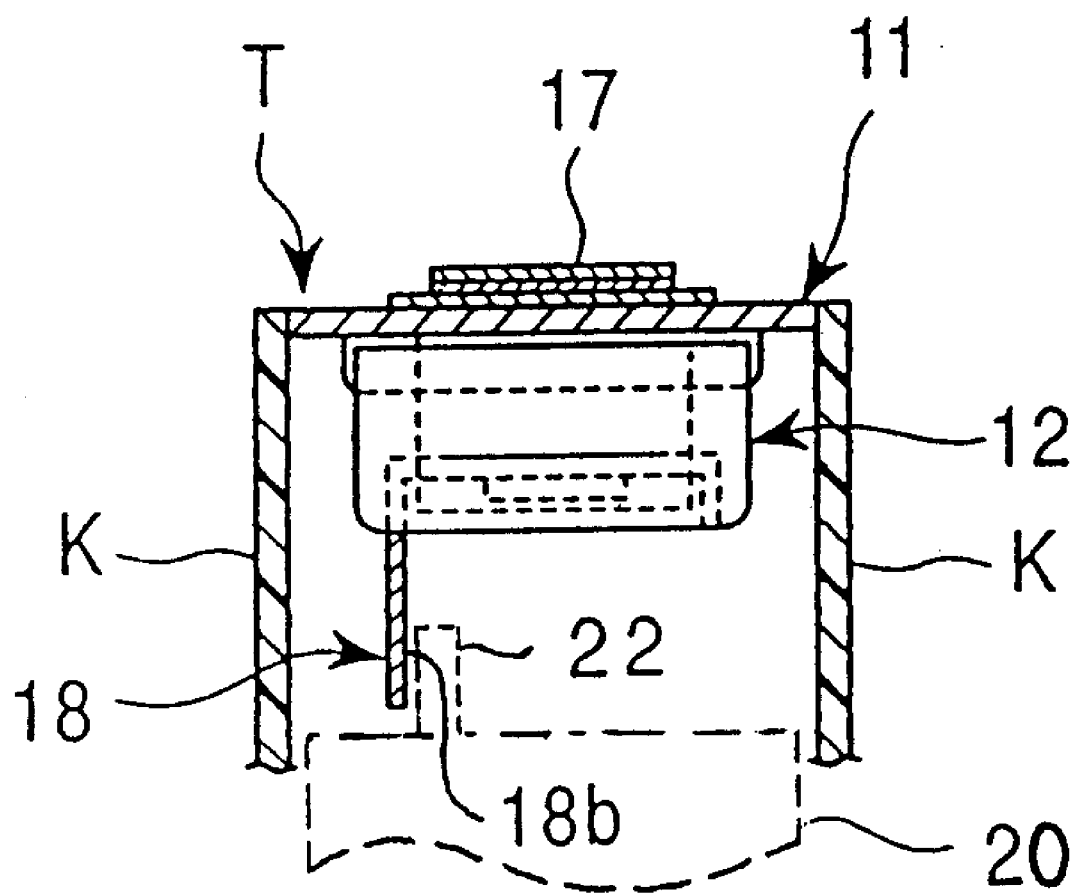
FIG. 4 is a sectional side view showing the principal part of the current cutoff mechanism.
Figure 5:
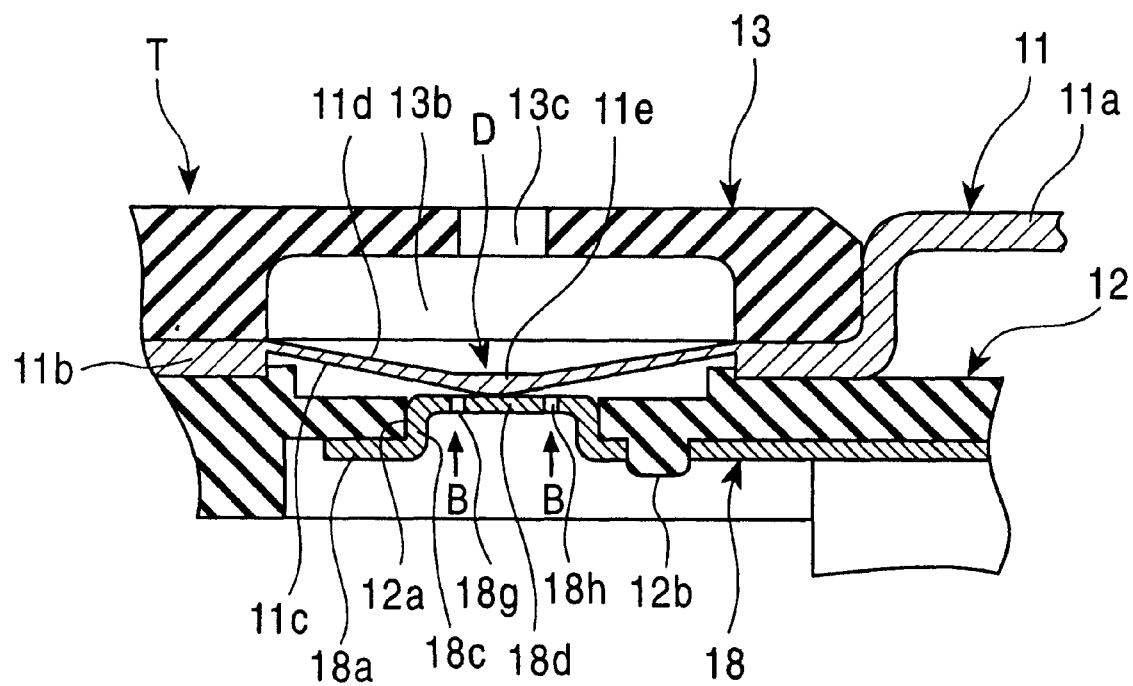
FIG. 5 is an enlarged sectional view of the current cutoff mechanism.
Figure 6A:
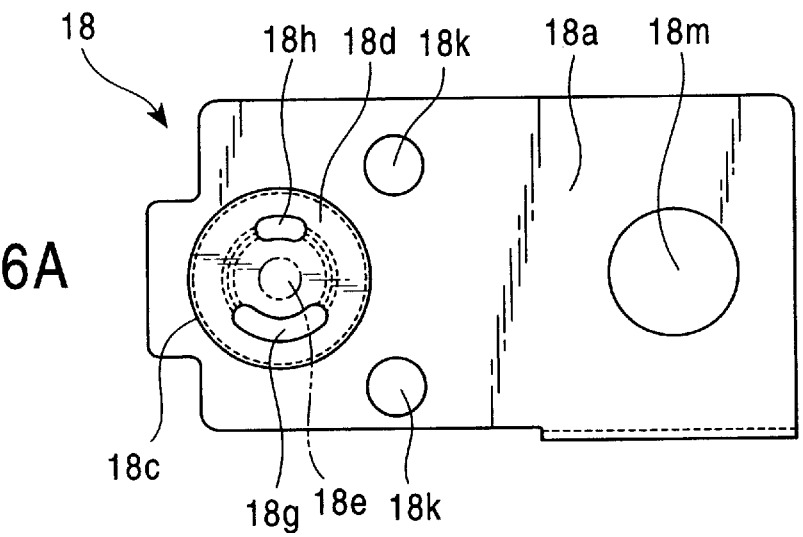
FIGS. 6A to 6C are views of an internal electrode in the current cutoff mechanism of the present invention.
Figure 6B:
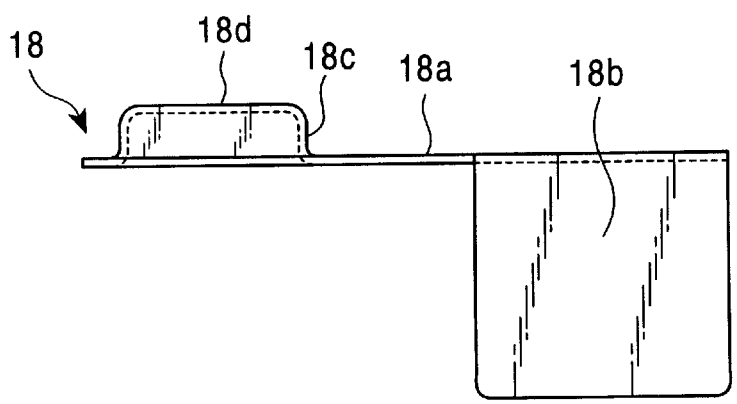
Figure 6C:
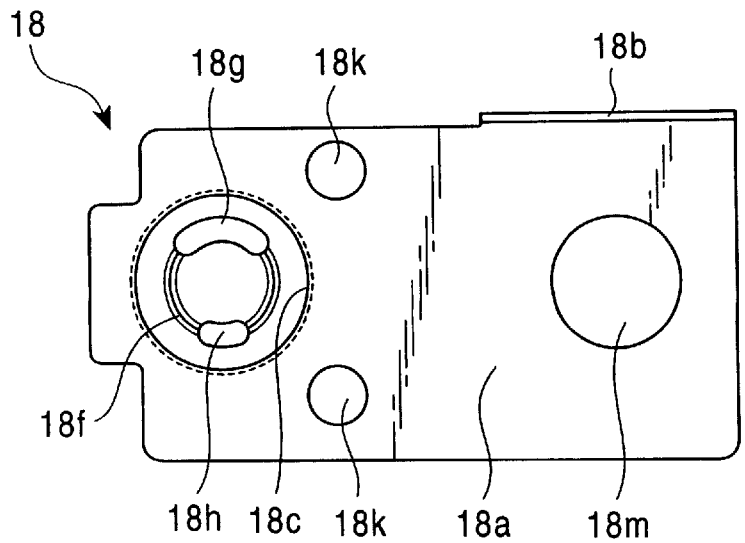
Figure 7:
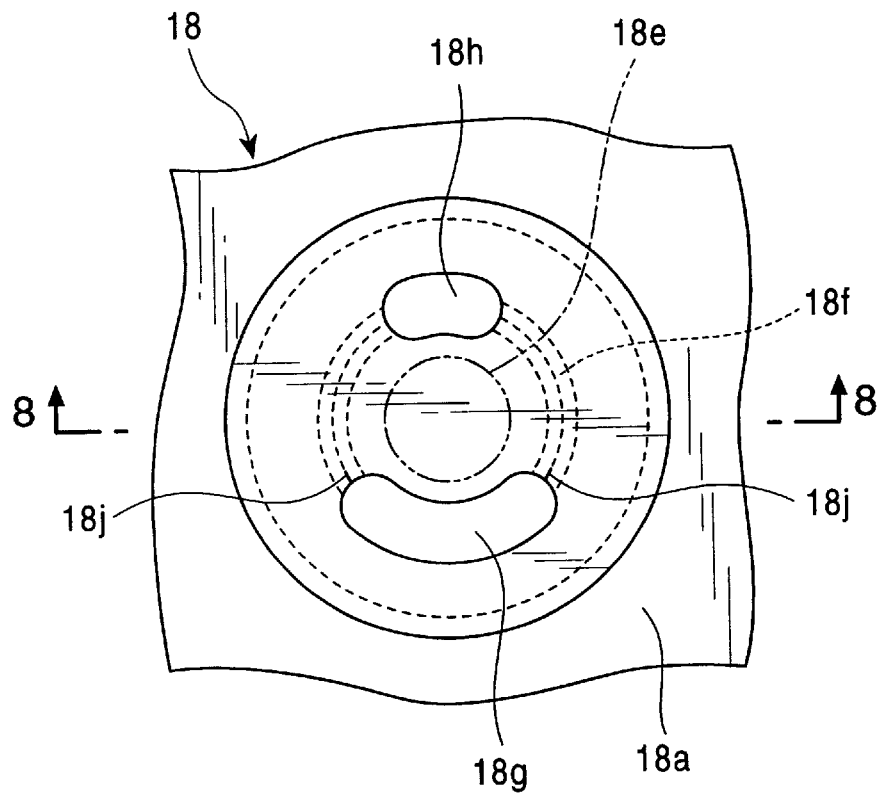
FIG. 7 is an enlarged view showing the principal part of the internal electrode.
Figure 8:
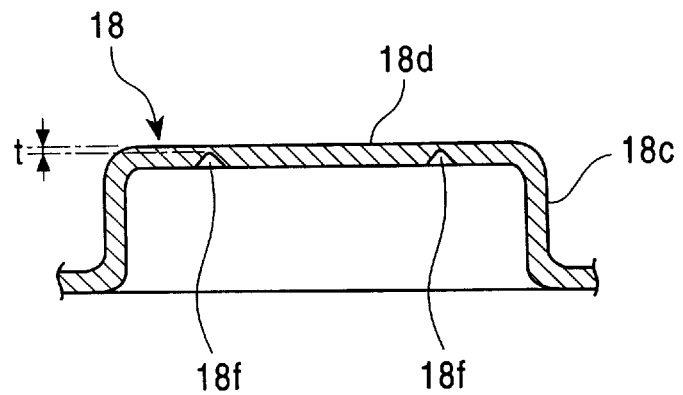
FIG. 8 is an enlarged sectional view showing the principal part of the internal electrode.
Figure 9:
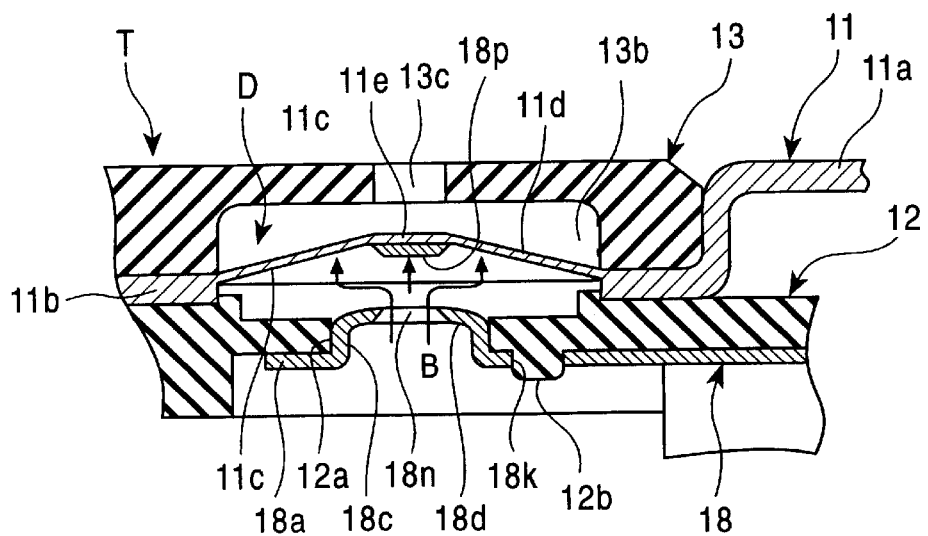
FIG. 9 is an enlarged sectional view of the principal part, illustrating the operation of the current cutoff mechanism.
Figure 10:
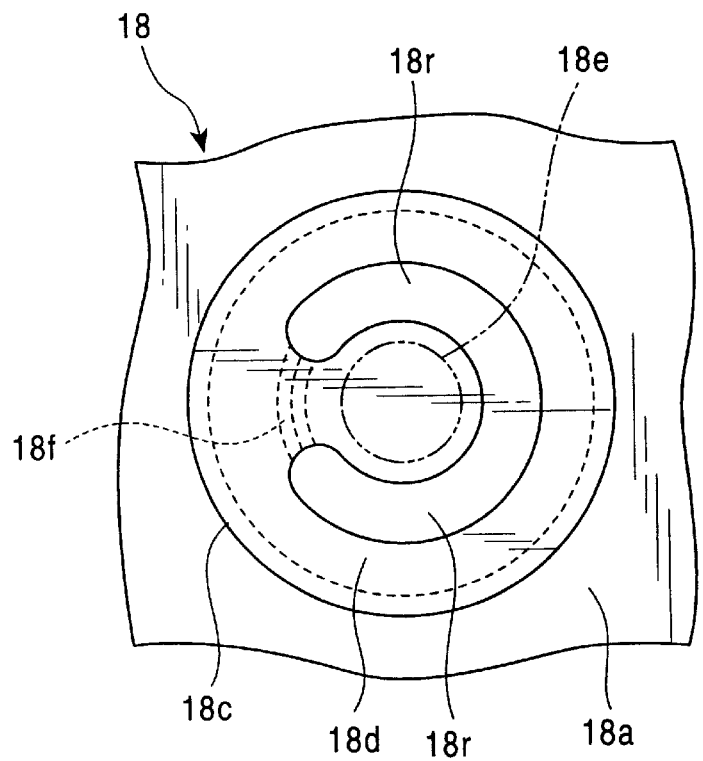
FIG. 10 is an enlarged view showing the principal part according to another embodiment of the present invention.
Figure 11:
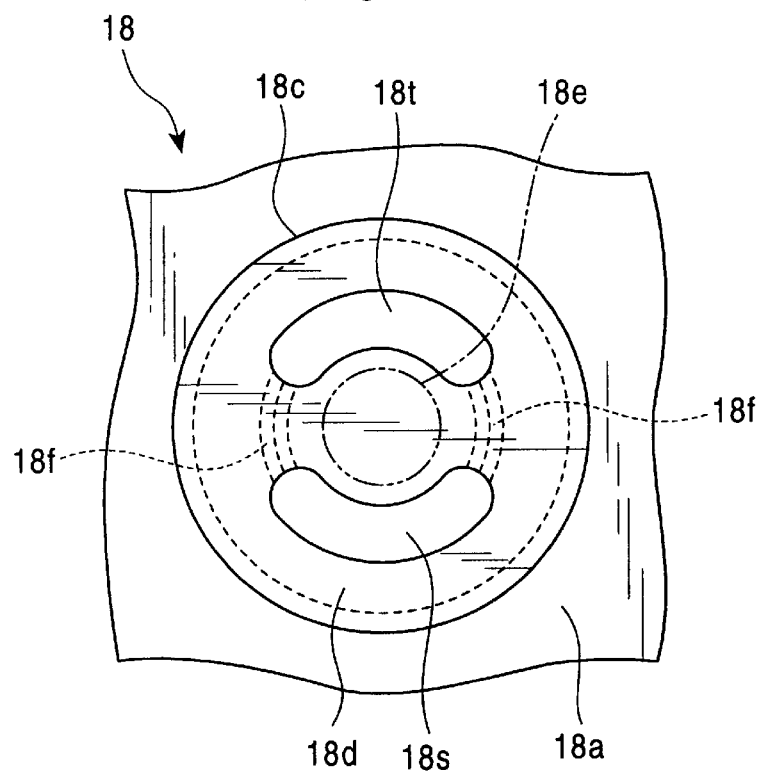
FIG. 11 is an enlarged view showing the principal part according to a further embodiment of the present invention.
Figure 12:
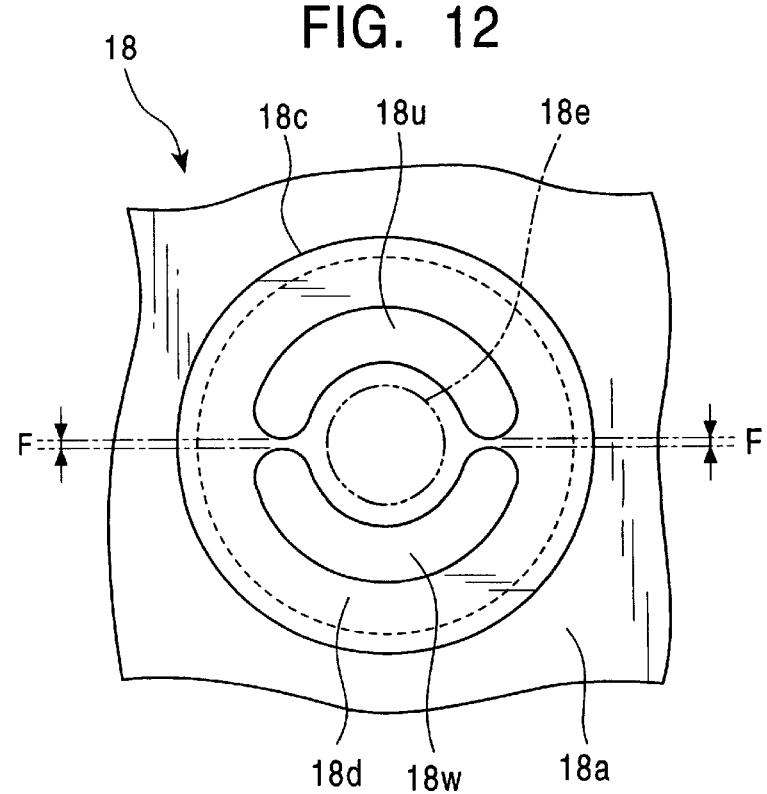
FIG. 12 is an enlarged view showing the principal part according to a still further embodiment of the present invention.
Figure 13:
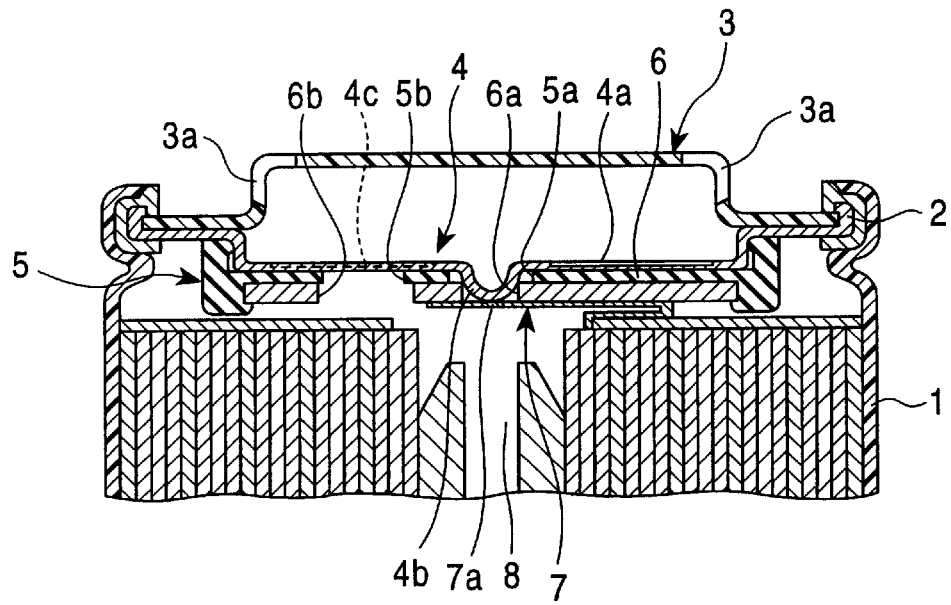
FIG. 13 is a sectional view showing the principal part of a conventional current cutoff mechanism for a cell.
Figure 14:
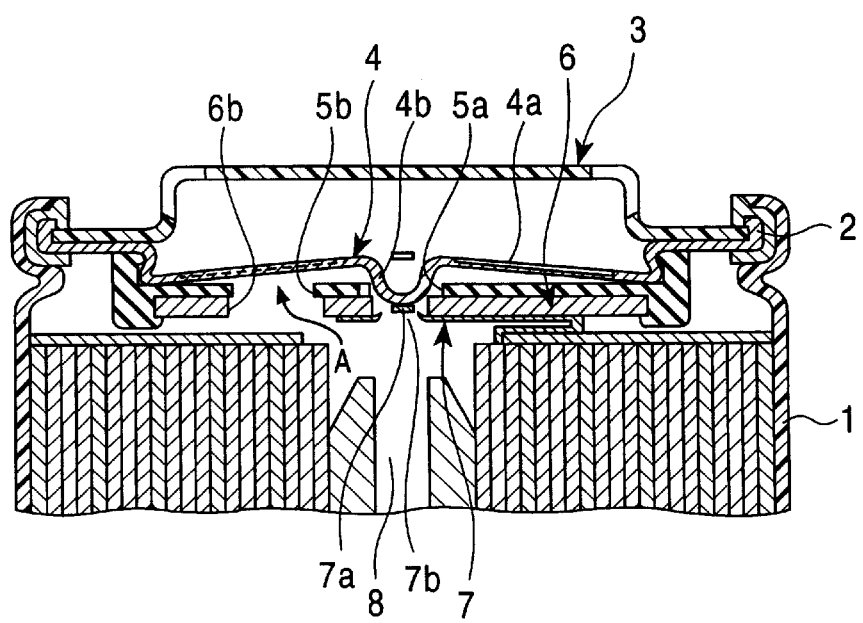
FIG. 14 is a sectional view of the principal part, illustrating the operation of the conventional current cutoff mechanism.

Cell current cutoff mechanisms according to the preferred embodiments of the present invention will be described below. FIG. 1 is a top view of a cell current cutoff mechanism according to an embodiment of the present invention, FIG. 2 is a cross-sectional view taken along line 2—2 of FIG. 1, showing a state in which the cell current cutoff mechanism is mounted in a cell case, FIG. 3 is a bottom view of the cell current cutoff mechanism, FIG. 4 is a side sectional view showing the principal part of the cell current cutoff mechanism, FIG. 5 is an enlarged sectional view showing the principal part of the cell current cutoff mechanism, FIGS. 6A to 6C are views of an internal cell according to the present invention, FIG. 7 is an enlarged plan view showing the principal part of the internal cell, FIG. 8 is an enlarged side sectional view showing the principal part of the internal cell, FIG. 9 is an enlarged sectional view of the principal part, illustrating the operation of the present invention, and FIGS. 10 to 12 are enlarged plan views showing other embodiments of the present invention.

A description will be given of a case in which a current cutoff mechanism T for a cell according to the present invention is used in, for example, a prismatic type cell. A cell lid 11 hermetically shields a cell case K holding a power generating element 20 therein. The cell lid 11 is sandwiched between a fixing member 12 disposed below and a pressing member 13 disposed above, and is riveted by a rivet 14 at the center. The cell lid 11, the fixing number 12, and the pressing member 13 are thereby combined into one.

A positive terminal 15 and a conductive washer 16 are provided at the bottom and top of the rivet 14, respectively. On the rivet 14, an external positive electrode 17 is joined to the conductive washer 16 so as to be electrically connected to the positive terminal 15. To the right side of the fixing member 12 in the figures, a negative terminal 18 having a lead 18a is mounted by riveting or by other methods.

The cell lid 11 in the above-described cell current cutoff mechanism T is formed of a conductive metal plate of, for example, stainless steel, and has a nearly rectangular outline, as shown in FIGS. 1 to 5. The cell lid 11 includes a flange portion 11a on the outer periphery, and a flat bottom plate 11b projected downward by subjecting the inner side of the flange portion 11a to drawing or the like.

The bottom plate 11b is provided, for example, with a diaphragm section D on the right side in the figure, and a safety valve section Z on the left side in the figure.

In the diaphragm section D, as shown in FIG. 5, a thinwalled portion lid is defined by an annular recess 11c formed from the lower surface of the bottom plate 11b by grinding or by other methods.

The thin-walled portion lid is formed in the shape of a bowl by a press or the like so as to protrude downward and toward the inside of the cell case K. At the center of the protruding thin-walled portion 11d, a thick-walled portion 11e is formed, which has a larger thickness than that of the thin-walled portion lid on the periphery thereof.

That is, the diaphragm section D is composed of the thick-walled portion 11e at the center, and the thin-walled portion 11d formed on the periphery of the thick-walled portion 11e. The thick-walled portion lie can be vertically displaced relative to the base of the thin-walled portion 11d.

The safety valve section Z includes a flat thick-walled projecting portion 11f having an annular outline so as to project upward, and a connecting portion 11g formed by thinning the base of the projecting portion 11f.

Mounted on the lower surface of the bottom plate 11b of the cell lid 11 is the rectangular fixing member 12 that is smaller than the outline of the cell lid 11 and that is made of an insulating material. The fixing member 12 has a lead insertion hole 12a formed therethrough under the thick-walled portion 11e at the center of the diaphragm section D, and positioning projections 12b projecting downward adjacent to the right side of the lead insertion hole 12a.

Under the safety valve section Z, a vent hole 12c is formed so as to be larger than the outer periphery of the safety valve section Z.

At the center of the fixing member 12, a cylindrical portion 12e, having a center hole 12d for passing the rivet 14 therethrough, projects upward.

On the right side of the positioning projections 12b of the fixing member 12, a riveted portion 12f projects downward.

On the bottom plate 11b of the cell lid 11, the pressing member 13 is placed to press and mount the cell lid 11 on the fixing member 12. The pressing member 13 is made of an insulating material and has a center hole 13a for passing the cylindrical portion 12e of the fixing member 12 therethrough. Above the diaphragm section D, a first concave portion 13b is formed to serve as an escape for the upwardly displaced diaphragm section D, and is provided with a first vent hole 13c formed therethrough.

Above the safety valve section Z, the pressing member 13 has a second concave portion 13d where the safety valve section Z is placed. The second concave portion 13d has a second vent hole 13e formed therethrough.

The rivet 14 of aluminum or the like is passed through the center hole 12d of the fixing member 12, and has a head portion 14a at the bottom, and a leading end portion 14b, which projects from the cylindrical portion 12e, at the top.

On the lower side of the fixing member 12, the positive terminal 15 bent nearly in the L-shape is held between the head portion 14a of the rivet 14 and the fixing member 12. On the upper side of the pressing member 13, the leading end portion 14b of the rivet 14 is pressed for riveting, and the conductive washer 16 is fitted thereon, which is formed of a metal plate and is nearly shaped like a bowl.

On the pressed leading end portion 14b of the rivet 14, the external positive electrode 17 is fixed to a flange portion on the periphery of the conductive washer 16 by spot welding or by other methods. The external positive electrode 17 is formed of a steel plate or the like, and the surface thereof is nickel-plated. The external positive electrode 17 and the positive terminal 15 are electrically connected via the rivet 14.

The negative terminal 18 including an internal electrode shown in FIGS. 6A to 6C is mounted on the fixing member 12 by fitting a rivet hole 18m on the riveted portion 12f of the fixing member 12 and riveting the riveted portion 12f, as shown in FIG. 2.

The negative terminal 18 has a flat lead portion 18a in contact with the lower surface of the fixing member 12. On the right side of the lead portion 18a, a terminal portion 18b is bent down ward in the L-shape.

On the right side of the lead portion 18a, a cylindrical projecting portion 18c is formed by drawing or by other methods so as to project upward. The projecting portion 18c is inserted in the lead insertion hole 12a of the fixing member 12.

A flat top portion 18d is formed at the top of the projecting portion 18c, and has the same thickness as that of the projecting portion 18c therearound. In approximately the center of the upper surface of the top portion 18d, a joint portion 18e crosshatched in FIG. 7 is formed to be joined to the thick-walled portion 11e of the diaphragm section D by welding or by other methods.

The top portion 18d also has a groove portion 18f for making the periphery of the joint portion 18e thin-walled. As shown in FIG. 8, the groove portion 18f is shaped in an annular form around the joint portion 18e by press working or by other methods so as to have a V-shaped cross section.

In a part of the groove portion 18f, two slits 18g and 18h are formed so that they are curved along the annular groove portion 18f and are opposed to each other across the joint portion 18e. One of the slits 18g is longer than the other slit 18h.

Break-inducing portions 18j are formed by slightly cutting the portions of the groove portion 18f in contact with both ends of the longer slit 18g by a press or the like.

Adjacent to the projecting portion 18c in the lead portion 18a, two positioning holes 18k are formed, in which the positioning projections 12b of the fixing member 12 are fitted. On the right side of the lead portion 18a opposite from the projecting portion 18c, the rivet hole 18m is formed for riveting of the riveted portion 12f of the fixing member 12.

The projecting portion 18c of the internal electrode 18 is inserted in the lead insertion hole 12a, and the joint portion 18e of the top portion 18d is joined to the thick-walled portion 11e near the center of the diaphragm section D by spot welding or by other methods.

The internal electrode 18 is joined to the diaphragm section D, and is fixed to the fixing member 12 by riveting the riveted portion 12f of the fixing member 12 that is placed in the rivet hole 18m.

The movement of the internal electrode 18 is limited by the positioning projections 12b fitted in the positioning holes 18k.

In the cell current cutoff mechanism T having such a configuration, as shown in FIG. 2, the flange portion 11a on the outer periphery of the cell lid 11 is fixed by welding or by other methods to the cell case K having the power generating element 20 therein, thereby hermetically shielding the cell case K.

In the cell incorporating this current cutoff mechanism T, a current path is formed between the cell lid 11 and a negative terminal 22 of the power generating element 20 via the diaphragm section D and the internal electrode 18.

Next, a description will be given of the operation of the cell current cutoff mechanism T according to the present invention. When the internal pressure of the cell rises due to a problem inside the cell, gas which has increased in pressure enters the concave portion 11c from the two slits 18g and 18h, as shown by the arrows B in FIG. 5, and the force acts to push the thin-walled portion lid of the diaphragm section D upward.

When the internal pressure of the cell exceeds a predetermined value, the joint portion 18e of the internal electrode 18 is pulled up by the diaphragm section D. The pulling force is concentrated on the groove portion 18f that is thin-walled.

The pulling force is concentrated on the side of the groove portion 18f in contact with the longer slit 18g, whereby the side of the longer slit 18g is broken earlier than the side of the groove portion 18f in contact with the shorter slit 18h. The break of the side of the longer slit 18g causes the groove portion 18f to be broken at a stroke, whereby the diaphragm section D is inverted to be displaced up.

The break-inducing portions 18j are formed in the portions of the groove portion 18f in contact with both ends of the slit 18g, and this allows the groove portion 18f to be more easily broken from the side of the slit 18g.

With the upward inversion of the diaphragm section D, the joint portion 18e of the internal electrode 18 is broken, a broken hole 18n is formed in the top portion 18d, and a broken piece 18p adheres to the thick-walled portion 11e of the inverted diaphragm section D, as shown in FIG. 9.

For this reason, the top portion 18d of the internal electrode 18 and the broken piece 18p are separated from each other, thereby breaking the current path between the cell lid 11 and the negative terminal 22 of the power generating element 20 inside the cell. This break of the current path blocks the increase in pressure inside the cell case K, and cell break can be prevented beforehand.

If the pressure inside the cell further rises in spite of the cutoff of the current path between the cell lid 11 and the power generating element 20 inside the cell, a more increased internal pressure is applied to the projecting portion 11f of the safety valve section Z. The force acts to push the projecting portion 11f upward, and to thereby break the connecting portion 11g that is thin-walled.

When the connecting portion 11g is broken, high-pressure gas inside the cell is discharged from the broken portion to the outside, thereby preventing the cell from being ruptured.

While the groove portion 18f has a V-shaped cross section in the above-described cell current cutoff mechanism T, it may have a U-shaped or angular U-shaped cross section, and the lead portion 18a may be thin-walled.

While the two slits 18g and 18h are formed along the groove portion 18f of the internal electrode 18, only the groove portion 18f may be formed without the slits 18g and 18h (not shown).

As shown in FIG. 10, a single curved slit 18r may be formed in a part of the groove 18f, instead of the slits 18g and 18h. That is, the groove portion 18f may be formed between both ends of the slit 18r.

The asymmetric slits 18g and 18h may be replaced with two symmetric slits 18s and 18t, as shown in FIG. 11.

While the joint portion 18e is placed at the midpoint between the two slits 18g and 18h, it may be offset toward one of the slits (not shown). In this case, it is possible to break the side of the groove portion 18f in contact with the slit to which the joint portion 18e is closer.

As shown in FIG. 12, two symmetric slits 18u and 18w may be disposed so that small clearances F are formed between both ends thereof. In this case, the clearance portions F may be thin-walled by being crushing by a press or the like.

In the cell current cutoff mechanism of the present invention, a current path is formed between the cell lid and the power generating element 20 via the diaphragm section D and the internal electrode 18, and the groove portion 18f is formed to thin the periphery of the joint portion 18e of the internal electrode 18. When the internal pressure of the cell case exceeds a predetermined value and the diaphragm section D is displaced, the internal electrode 18 is broken from the groove portion to cut off the current path. Therefore, it is possible to easily break the internal electrode 18 from the groove portion 18f, and to precisely break the internal electrode 18 even when the internal pressure of the cell rises to a low pressure.

The groove portion 18f that is easily broken reduces the size of the diaphragm section D.

Since the groove portion 18f has a V-shaped cross section and is annularly formed around the joint portion 18e, it is possible to more easily break the internal electrode 18 at low pressure.

Since a slit curved along the groove portion is formed in a part of the groove portion 18f, it is possible to reduce the length of the groove portion 18f, and to easily break the internal electrode 18 even when the internal pressure of the cell rises to a low pressure.

Since two slits 18g and 18h, as shown in FIG. 7, are formed opposed to each other across the joint portion 18e, it is possible to reduce the length of the parts of the groove portions 18f between the ends of the slits, and to more easily break the internal electrode 18.

Since one 18h of the two slits 18g and 18h is longer than the other slit 18g, stress can be concentrated on the side of the groove portion 18j in contact with the longer slit 18g, and the internal electrode 18 can be broken from the side of the longer slit 18g earlier. This makes it possible to easily break the internal electrode 18 even when the internal pressure of the cell rises to a low pressure.

Since the joint portion 18e held between the slits is formed offset toward one of the slits, the side of the groove portion in contact with the slit, to which the joint portion 18e is closer, can be broken earlier. Therefore, it is possible to easily break the internal electrode 18 even when the internal pressure of the cell rises to an even lower pressure.

The lead break-inducing portions 18j are formed by slightly cutting the positions of the groove portions in contact with both ends of one of the slits so that the break of the internal electrode 18 is induced by the lead break-inducing portions when the internal pressure of the cell case rises. Therefore, the break is possible even when the internal pressure of the cell rises to an even lower pressure.

A current path is formed between the cell lid 11 and the power generating element 20 via the diaphragm section D and the internal electrode 18, as shown in FIG. 12. Two arc-shaped slits 18u and 18w are formed opposed to each other around the joint portion 18e, and small clearances F are formed between both ends of the two slits. When the internal pressure of the cell case K exceeds a predetermined value and the diaphragm section D is displaced, the internal electrode is broken from the clearance portions F. Therefore, it is possible to break the internal electrode 18 only with the slits 18u and 18w, without forming the groove portion 18f and to thereby provide a cell current cutoff mechanism that is easy to work.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A current cutoff mechanism for a cell, comprising:
   a cell case having a power generating element held therein;

a cell lid for hermetically shielding an inside of said cell case;

a diaphragm section protruding toward the inside of said cell case;

a terminal connected to said power generating element and having a joint portion to be joined to approximately a center of said diaphragm section; and a fixing member for fixing said terminal inside said cell case while said terminal is joined to said diaphragm section, wherein a current path is formed between said cell lid and said power generating element via said diaphragm section of said terminal, a groove portion is formed to thin a portion around said joint portion of said terminal, and said terminal is broken from said groove portion to cut off the current path when the internal pressure of said cell case exceeds a predetermined value and said diaphragm section is displaced.

2. A current cutoff mechanism according to claim 1, wherein said groove portion has a V-shaped cross section, and is annularly formed around said joint portion.

3. A current cutoff mechanism according to claim 1, wherein a slit curved along said groove portion is formed in a part of said groove portion.

4. A current cutoff mechanism according to claim 3, wherein two slits are formed opposed to each other across said joint portion.

5. A current cutoff mechanism according to claim 4, wherein one of said slits is longer than the other slit.

6. A current cutoff mechanism according to claim 4, wherein said joint portion held between said two slits is formed offset toward one of said slits.

7. A current cutoff mechanism according to claim 4, wherein a break-inducing portion is formed by slightly cutting a part of said groove portion in contact with both ends of said slit so that said terminal is broken from a side of said break-inducing portion when the internal pressure of said cell case rises.

8. A current cutoff mechanism for a cell, comprising:

a cell case having a power generating element held therein;

a cell lid for hermetically shielding an inside of said cell case;

a diaphragm section protruding toward the inside of said cell case;

a terminal connected to said power generating element and having a joint portion to be joined to approximately a center of said diaphragm section; and a fixing member for fixing said terminal inside said cell case while said internal electrode is joined to said diaphragm section, wherein a current path is formed between said cell lid and said power generating element via said diaphragm section of said internal electrode, two arc-shaped slits are formed around said joint portion so as to be opposed to each other, clearances between both ends of said two slits are made small, and said terminal is broken from said clearances when the internal pressure of said cell case exceeds a predetermined value and said diaphragm section is displaced.

\* \* \* \* \*